United States Patent [19]
Parker et al.

[11] Patent Number: 5,807,010
[45] Date of Patent: Sep. 15, 1998

[54] PIVOTAL BALL-END LINK

[75] Inventors: Eric G. Parker, Elgin; Corey M. Rivard, Batavia, both of Ill.

[73] Assignee: Illinois Tool Works Inc., Glenview, Ill.

[21] Appl. No.: 619,009

[22] Filed: Mar. 21, 1996

Related U.S. Application Data

[63] Continuation-in-part of Ser. No. 192,447, Feb. 7, 1994, abandoned.

[51] Int. Cl.$^6$ .............................. F16C 11/06; B60G 21/00
[52] U.S. Cl. ........................... 403/61; 403/116; 403/228; 403/122; 280/689
[58] Field of Search ............................. 403/61, 116, 117, 403/113, 112, 228, 225, 167, 122; 280/673, 674, 689, 716

[56] References Cited

U.S. PATENT DOCUMENTS

| | | |
|---|---|---|
| 3,034,810 | 5/1962 | Primeau . |
| 4,018,104 | 4/1977 | Bland et al. . |
| 4,113,278 | 9/1978 | Rissberger . |
| 4,369,988 | 1/1983 | Takagi . |
| 4,944,523 | 7/1990 | Hardy, Jr. et al. . |
| 5,062,655 | 11/1991 | Sommerer . |
| 5,387,004 | 2/1995 | Engel . |

FOREIGN PATENT DOCUMENTS

| | | | |
|---|---|---|---|
| 152526 | 2/1952 | Australia ................................ | 280/673 |
| 1285035 | 1/1962 | France .................................... | 403/116 |
| 3736130 | 8/1988 | Germany ................................ | 280/689 |
| 533159 | 9/1941 | United Kingdom .................... | 280/698 |

Primary Examiner—Heather Shackelford
Attorney, Agent, or Firm—Trexler, Bushnell, Giangiorgi & Blackstone, Ltd.

[57] ABSTRACT

An end link is provided for a stabilizer bar of a vehicle suspension system. The end link includes a rod having pairs of grommets generally at each end thereof. Each grommet includes a bushing and washer which are interengaged and rotatable with respect to each other. Each grommet further includes a central passageway that which the rod is disposed within and permits pivotal movement of the rod only substantially in a single plane relative to the grommets and permits substantially universal pivotal movement of the rod around the center of the grommets. The end link can also include a like rod having a pair of universal ball joint structures generally at each end thereof. Each structure includes a universal ball which is integrally formed with a spacer, a bushing and a washer. The bushing is rotatable with respect to the washer. Each structure further includes a central passageway that which the rod is disposed within and permits pivotal movement of the rod only substantially in a single plane relative to the structures and permits substantially universal pivotal movement of the rod around the center of the structures.

18 Claims, 4 Drawing Sheets

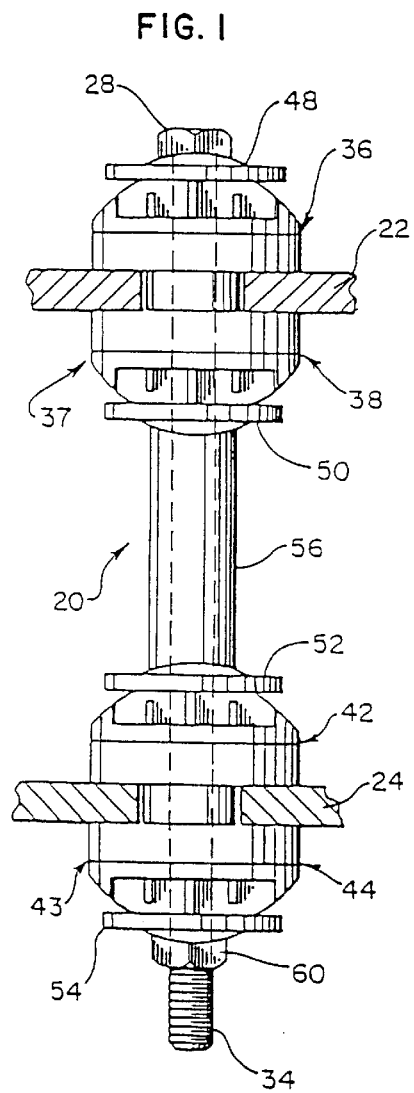
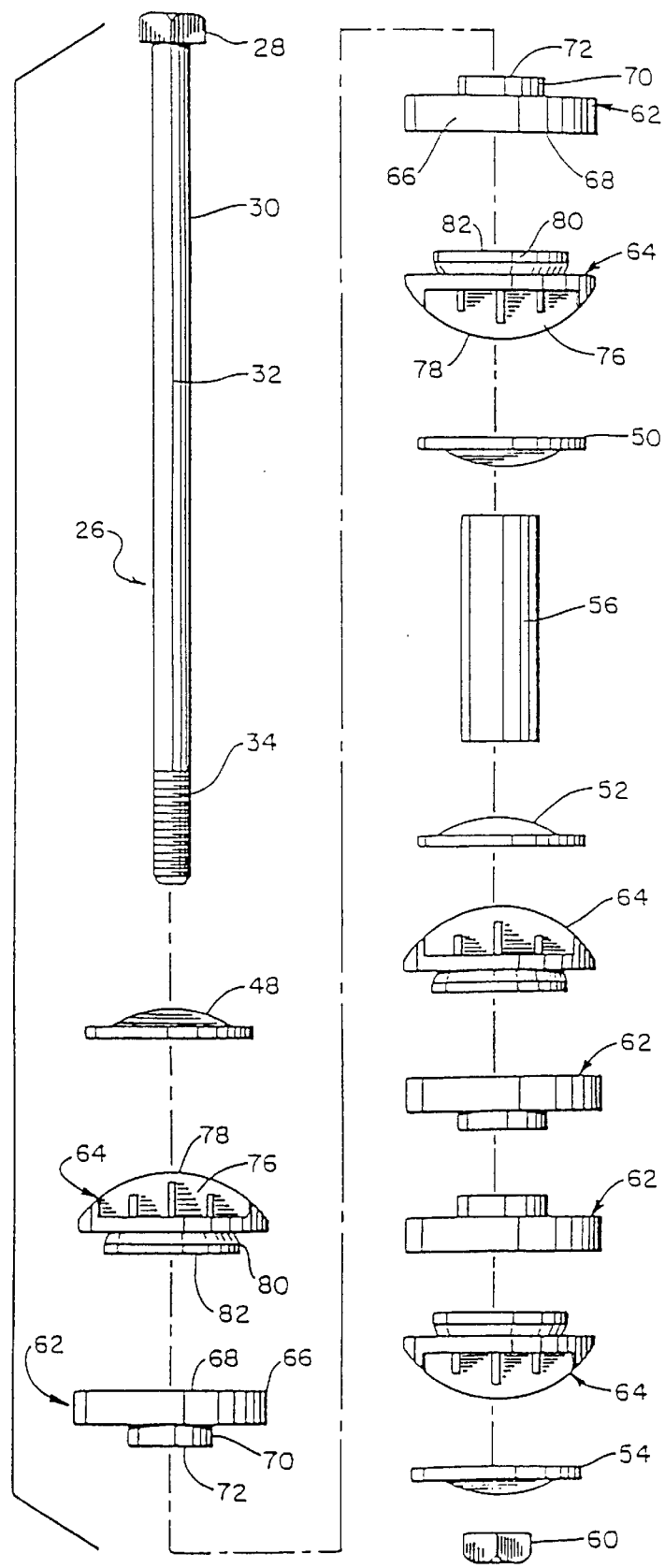

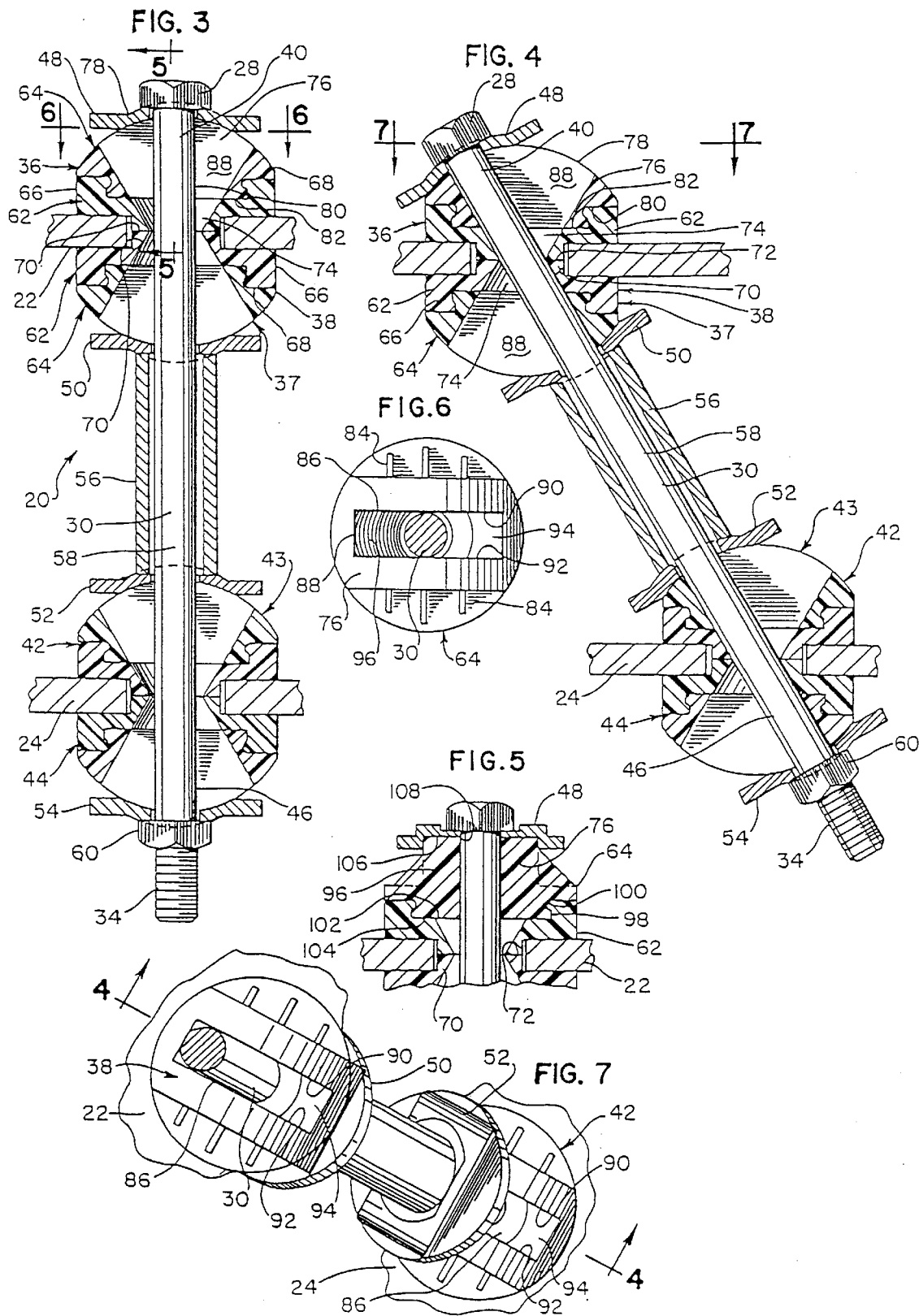

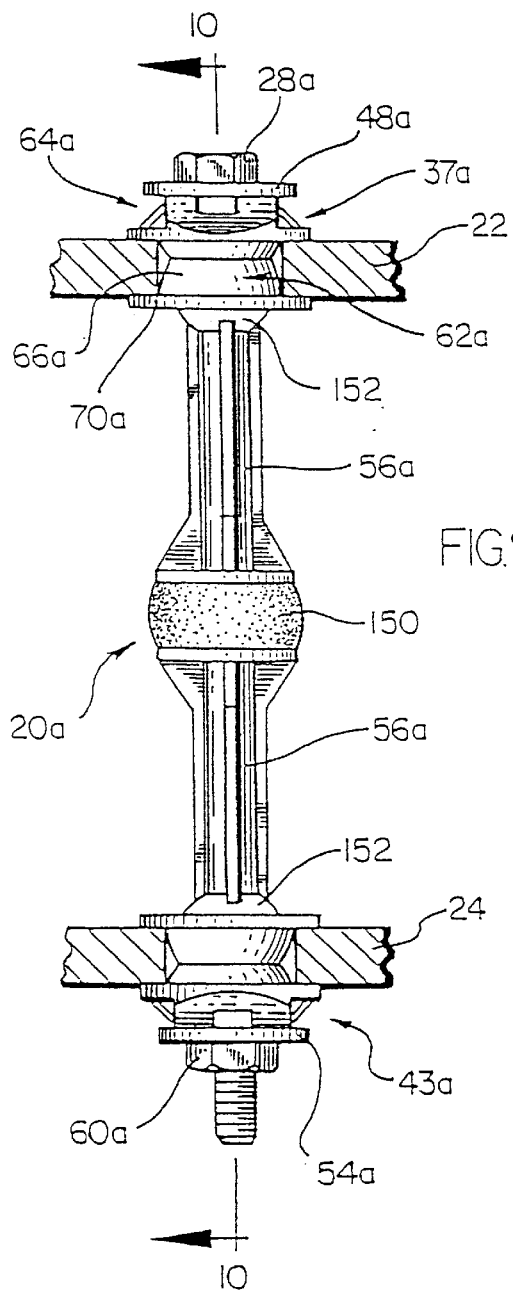
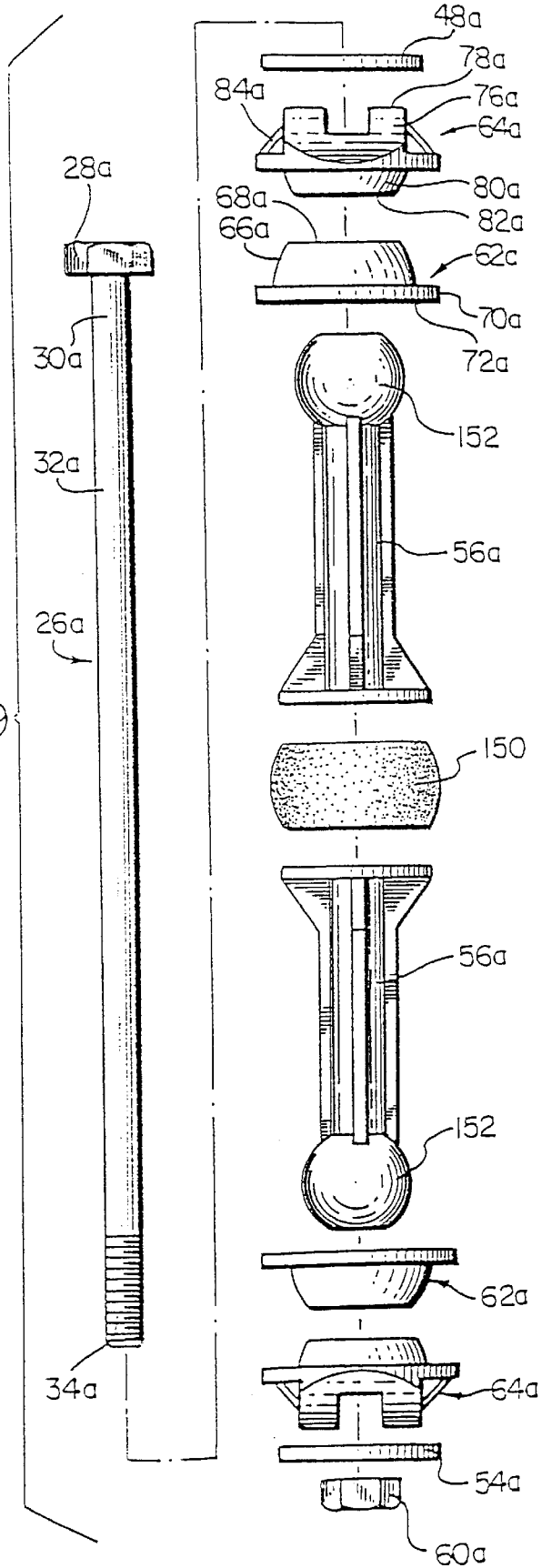

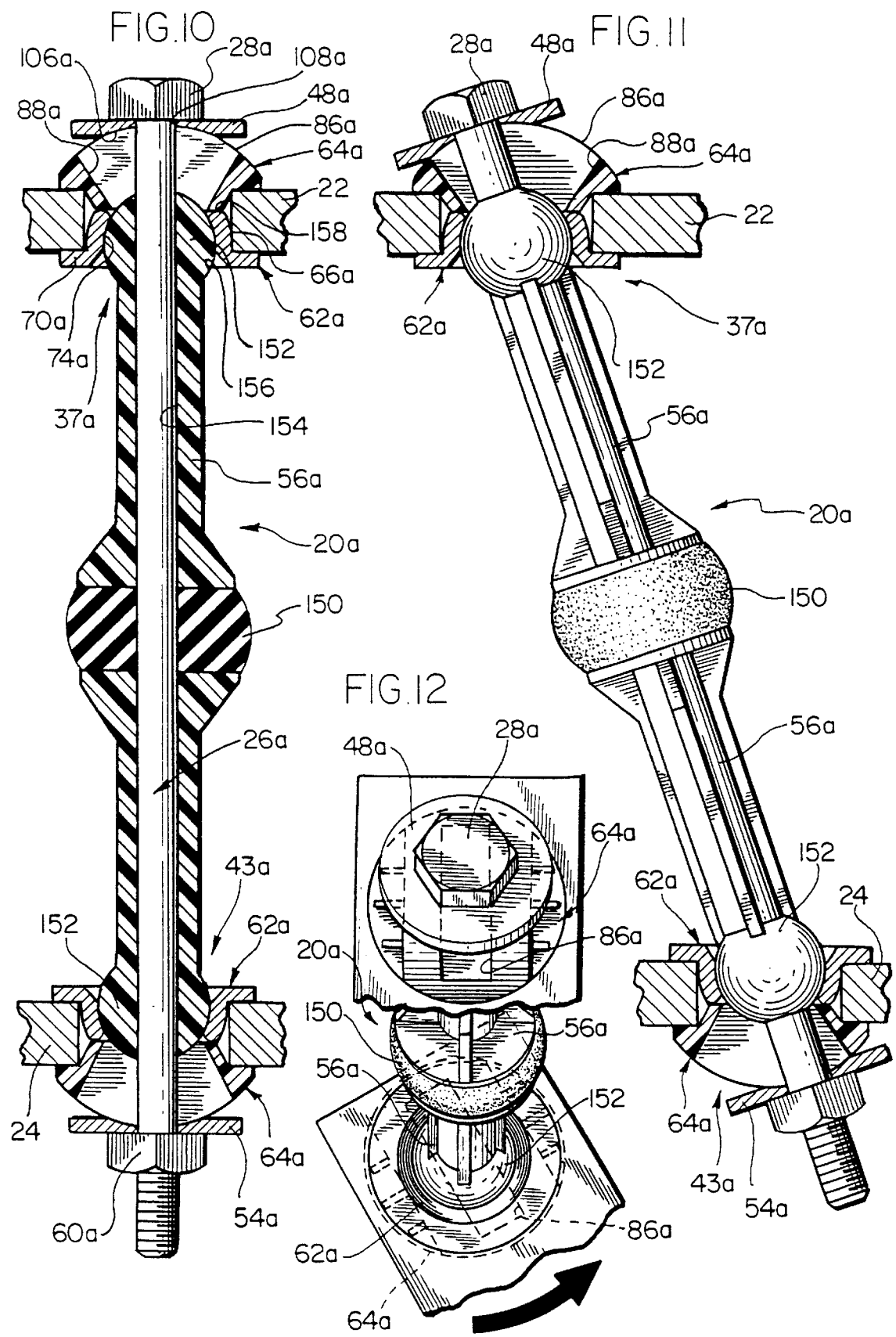

PIVOTAL BALL-END LINK

This application is a continuation-in-part application of patent application Ser. No. 08/192,447 entitled "Pivotal Ball-End Link" filed Feb. 7, 1994 now abandoned.

BACKGROUND OF THE INVENTION

This invention is generally directed to an end link for a stabilizer bar used in a suspension system for a vehicle, such as an automobile or a truck.

Suspension systems of the type contemplated herein usually include a stabilizer bar, a control element, and an end link connecting an end of the stabilizer bar with the control element so as to transmit forces therebetween. These end links have included pairs of grommets which embrace the stabilizer bar and the control element, respectively, a connecting rod or bolt extending through the grommets, and a spacer mounted on an intermediate portion of the bolt between the innermost grommets for spacing the stabilizer bar and the control element. The grommets include a generally straight axial passageway therethrough to allow the grommets to pivot around the rod. A suspension system and end link of the above-described type are disclosed in U.S. Pat. No. 4,944,523.

While these types of end links are effective in many applications, under some conditions the rod must be able to pivot to a larger degree with respect to the grommets than what is provided by the prior art end links. The present invention is intended to overcome this problem as well as to present several other improvements over prior art end links.

OBJECTS AND SUMMARY OF THE INVENTION

An object of the present invention is to provide a novel end link having a modified universal ball joint connection with elements of a vehicle suspension, which end link may be relatively economically produced.

A further object of the present invention is to provide an end link having end members which are capable of pivotal movement with respect to a connecting member or rod and are further capable of universal movement relative to a connecting member.

Another object of the present invention is to provide an end link that permits a lighter torsion bar to be used.

It is a further object of the present invention to provide an end link that includes end members which allow loads to be transmitted directly through the end members.

It is a specific object of the present invention to provide an end link having end members which include a pivot promoting slot.

Briefly, and in accordance with the foregoing, the present invention discloses an end link for a stabilizer bar of a vehicle suspension system.

A first embodiment of the end link includes an elongated connecting member or rod having a head at an end and a nut in threaded engagement with the rod at the other end, washers in engagement with the nut and head, a spacer which surrounds an intermediate portion of the rod, washers in engagement with the ends of the spacer, and pairs of grommets generally at each end of the rod. Each grommet includes a plastic bushing and washer which are interengaged and rotatable with respect to each other and combine to provide a ball member universal connection with the rod. Each grommet further includes a central passageway that which the rod is disposed within and permits pivotal movement of the rod only substantially in a single plane relative to said grommets and permit substantially universal pivotal movement of the rod around the center of the grommets.

A second embodiment of the novel end link assembly includes an elongated connecting member or rod having a head at an end and a nut in threaded engagement with the rod at the other end, washers in engagement with the nut and head, a universal ball joint structure which includes a universal ball member and a spacer integrally formed with the universal ball member and which surrounds an intermediate portion of the rod. The universal ball member is positioned generally at each end of the rod. Each universal ball joint structure further includes a bushing and washer which are engaged against each other. The washer is fixed relative to the control element. The bushing is rotatable with respect to the washer and the control element. Each bushing and washer further includes a central passageway that which the rod is disposed within and permits pivotal movement of the rod only substantially in a single plane relative to the universal joint structures and permit substantially universal pivotal movement of the rod around the center of the universal joint structures.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is an elevational view of an end link incorporating features of a first embodiment of the present invention fully assembled and embracing portions of a stabilizer bar and a control element, portions of which are shown in cross-section;

FIG. 2 is an exploded side elevational view of the end link shown in FIG. 1;

FIG. 3 is a cross-sectional view of the end link shown in a first position;

FIG. 4 is a cross-sectional view of the end link shown in a second, pivoted position and taken generally along line 4—4 in FIG. 7;

FIG. 5 is a partial cross-sectional view taken along line 5—5 in FIG. 3;

FIG. 6 is a plan view of the end link taken along line 6—6 in FIG. 3;

FIG. 7 is a plan view of the end link partially broken away taken along line 7—7 in FIG. 4 and without the head or washer at the top of the end link;

FIG. 8 is an elevational view of an end link incorporating features of a second embodiment of the present invention fully assembled and embracing portions of a stabilizer bar and a control element, portions of which are shown in cross-section;

FIG. 9 is an exploded side elevational view of the end link shown in FIG. 8;

FIG. 10 is a cross-sectional view of the end link shown in a first position and taken generally along line 10—10 in FIG. 8;

FIG. 11 is a cross-sectional view of the end link shown in a second, pivoted position; and FIG. 12 is a top, plan view of the end link in a pivoted and rotated position.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A first embodiment of an end link 20, which incorporates features of the present invention, is shown in FIGS. 1–7 of the drawings. A second embodiment of the end link 20a, which incorporates features of the present invention, is shown in FIGS. 8–12 of the drawings. Like elements in each embodiment are denoted by like reference numerals. The like reference numerals in the second embodiment include the suffix "a" thereafter.

Each embodiment of the end link 20, 20a is adapted to be assembled with first and second elements, for example, a torsion or stabilizer bar 22 and a control arm or element 24 of a vehicle suspension of known construction. The first and second elements 22 and 24 are preferably made of metal.

Attention is now directed to the first embodiment of the end link 20 as shown in FIGS. 1–7. The end link 20 includes an elongated connecting member or bar 26, which may be in the form of a bolt having an abutment or a head 28 at one end thereof or a stud having opposite threaded ends for receiving nuts (not shown). An elongated rod or shank 30 extends axially from the head 28 and includes an unthreaded portion 32 having a predetermined diameter and a threaded end portion 34.

As shown in FIG. 1, a first pair of grommets 36, 38, or first and second portions, which will be described in detail herein, is assembled generally at a first end 40 of the bolt 26, in a manner described in detail herein. The grommets 36, 38 combine to provide a first end or ball member 37 which embraces the suspension element 22. A second pair of grommets 42, 44, or first and second portions, is assembled generally at a second end 46 of the bolt 26. The grommets 42, 44 combine to provide a second end or ball member 43 which embraces the suspension element 24.

Washers 48, 50, 52, 54 engage the outermost extents of the grommets 36, 38, 42, 44 as described more fully in detail herein. A spool or spacer 56 is mounted on an intermediate portion 58 of the bolt 26 between the innermost grommets 38, 42 and engages the innermost washers 50, 52. The spacer 56 supports the innermost grommets 38, 52 thereby maintaining the desired spacing between the first element or stabilizer bar 22 and the second element or control element 24. A nut 60 is applied to the threaded end portion 34 of the bolt 26 for maintaining the parts in assembled relationship. Outermost washer 54 is disposed between the nut 60 and the outermost grommet 44. Outermost washer 48 is disposed between the head 28 and the outermost grommet 36.

The pairs of grommets 36, 38 and 42, 44 will be described in detail with respect to the first pair of grommets 36, 38 which combine to form the first ball member 37, with the understanding that the second pair of grommets 42, 44 which combine to form the second ball member 43, is identical in construction except that the second pair of grommets 42, 44 engages the control element 24.

Referring now to FIG. 2, it is seen that each grommet 36, 38 is comprised of first and second sections, a washer 62 and a bushing 64. The washer 62 and bushing 64 are interengaged with each other and are relatively rotatable with respect to each other in response to universal movement between the rod 30 and the ball members 37, 43 as described more in detail hereinbelow. The washer 62 and bushing 64 are made of suitable materials, preferably hard plastic, for reasons described herein.

Each washer 62 has an annular body portion 66 which defines a first end 68 and a protruding generally cylindrically shaped shoulder 70 which defines a second end 72. Each end 68, 72 has a circular aperture formed therein and the washer 62 has a central passageway 74 therethrough which is generally conically shaped such that the passageway 74 generally tapers from the first end 68 to the second end 72. The aperture at the second end 72 of the washer 62 is of a predetermined diameter which is larger than the diameter of the rod 30 so as to allow the rod 30 to pivot with respect to the washer 62.

Each bushing 64 includes an arcuate or partially spherical body portion 76 which defines a first end 78 and a protruding portion 80 extending therefrom which defines a second end 82. The bushing 64 may include ribs 84 to reinforce and strengthen the arcuate body portion 76.

A straight, elongated slot 86, as best shown in FIGS. 6 and 7, is formed in the first end 78 of the bushing 64 and promotes the pivoting of the rod 30 with respect to the ball members 37, 43 as described hereinbelow. The slot 86 extends generally along the entire arc of the arcuate portion 76.

The bushing 64 further includes a central passageway 88 therethrough which commences at the straight slot 86 at the first end 78 of the bushing 64 and terminates at the second end 82 of the bushing 64. The passageway 88 includes four surfaces or walls 90, 92, 94, 96 with the side surfaces or walls 90, 92 being generally vertical and the end surfaces or walls 94, 96 tapering from the first end 78 of the bushing 64 to the second end 82 at an angle similar to that of the conical passage 74. The slot 86 and associated passageway 88 have a width which is approximately equal to the diameter of the rod 30. When the washer 62 and bushing 64 are interengaged as described below, the washer passageway 74 and the bushing passageway 88 are aligned to form a passageway 74, 88, which has a cross-section, as best shown in FIGS. 3 and 4, that tapers from the bushing first end 78 to the washer second end 72.

To interengage the washer 62 and the bushing 64, the protruding portion 80 of the bushing 64 is snapped into and is held securely within a complementarily shaped recess 98 generally at the first end 68 of the washer 62. The washer 62 includes a shoulder or annular rib 100 interengageable with a complementary shoulder on the bushing 64 whereby the washer 62 and bushing 64 are securely held together. With this configuration, the washer 62 and bushing 64 simply snap together to form the completed grommet 36 or 38 while permitting the washer 62 and bushing 64 to freely rotate relative to each other. It is to be understood that other interengaging structures are within the scope of the invention so long as the washer 62 and bushing 64 are able to freely rotate relative to each other. For example, a hook shaped boss may be formed on the bushing with a complementarily shaped recess in the washer.

The bottom surface 102 of the bushing 64 and the top surface 104 of the washer 62 provide bearing surfaces along which the washer 62 and bushing 64 may rotate with respect to each other. These bearing surfaces 102, 104 are generally smooth and so as to allow the parts to rotate easily relative to each other. Since the washer 62 and bushing 64 are preferably made of plastic, a desired ease of rotation between these parts can be achieved by modifying the coefficient of friction of the plastic material used. For example, nylon may be used to produce the washer 62 and the bushing 64 may be made of acetal copolymer or acetal homopolymer.

To form the grommets 36, 38 and 42, 44 which are disposed on each end 40, 46, respectively, of the bolt 26, the washer 62 and the bushing 64 are interengaged, as described above, to form a completed grommet 36, 38 and 42, 44. The second ends 72 of each of the washers 62 are placed in an abutting relationship to form the ball members 37 and 43. The stabilizer bar 22 or control element 24 is held between the washers 62. It is to be understood that the coefficient of friction of the plastic washer 62 is sufficiently related to the coefficient of friction of the metal stabilizer bar 22 or the metal control element 24 such that the ball members 37 and 43 generally do not rotate relative to the elements 22, 24 which prevents undue wear of the washers 62. The rod 30 is disposed within the aligned passageways 74, 88 of each grommet 36, 38 and 42, 44.

The washers 48, 50, 52, 54 which engage the outermost extents of each grommet 36, 38 and 42, 44, respectively, include a seat 106 that is complementarily shaped to the arcuate portion 76 of the bushing 64. The washers 48, 50, 52, 54 are formed from a suitable material, preferably metal, such as steel, and the seat 106 may be formed by any suitable known method, such as stamping or coining. When a washer 48, 50, 52 or 54 is disposed on the arcuate portion 76 of the bushing 64, the washer 48, 50, 52 or 54 is free to travel along the arc of the arcuate portion 76 when there is relative movement between the stabilizer bar 22 and the control element 24. Each washer 48, 50, 52, 54 also includes a circular aperture 108 generally in the center thereof to allow the rod 30 to pass through the washer 48, 50, 52, 54.

Now that the specifics of the first embodiment of the end link 20 have been described, a general description of how the end link 20 operates will be explained. Initially, the bolt 26 extends generally perpendicularly between the first element or stabilizer bar 22 and the second element or control element 24, as shown in FIG. 3, and, as shown in FIG. 6, sits generally in the center of the ball members 37, 43.

When an input load is incurred, the rod 30 begins to move or pivot along a single plane in the straight slot 86. When the rod 30 pivots, the seat 106 of each washer 48, 50, 52, 54 slides along the arc of the arcuate portion 76. Since the aligned passageway 74, 88 is tapered, the rod 30 is free to pivot plus or minus 30° from the vertical position or some lesser or greater angle determined by the slope of the passage 74, 88 surface.

As the rod 30 leaves the center of the slot 86 and as any amount of side load is incurred, the rod 30 begins to push against the vertical side wall 90 or 92 of the slot 86. This force results in a moment about the center of the bushing 64 causing it to rotate relative to the washer 62 as shown in FIGS. 4 and 7. The rod 30 can universally pivot generally around the center of each ball member 37, 43, that is, move 360° conically by this pivoting on each end of the end link 20.

Since the rod 30 passes directly through ball members 37 and 43 which are respectively provided by the grommets 36, 38 and 42, 44, loads are directly transmitted through the grommets 36, 38 and 42, 44. This allows a lighter torsion bar to be used. Furthermore, since the end link 20 is comprised of few parts and is easily assembled, the end link 20 may be economically produced.

Attention is now directed to the second embodiment of the end link 20a as shown in FIGS. 8–12. The end link 20a includes an elongated connecting member or bar 26a, which may be in the form of a bolt having an abutment or a head 28a at one end thereof or a stud having opposite threaded ends for receiving nuts (not shown). An elongated rod or shank 30a extends axially from the head 28a and includes an unthreaded portion 32a having a predetermined diameter and a threaded end portion 34a.

As shown in FIG. 8, a first universal ball joint or end member 37a, which is described in detail herein, is assembled generally at a first end 40a of the bolt 26a, in a manner described in detail herein. The first end member 37a embraces the suspension element 22. A second universal ball joint or end member 43a is assembled generally at a second end 46a of the bolt 26a and embraces the suspension element 24. Washers 48a, 54a engage the outermost extents of the end members 37a, 43a as described more fully in detail herein. The first and second end members 37a, 43a are separated from each other by a shock absorber 150, made of suitable materials, such as rubber or other elastomers which can absorb shock forces.

The end members 37a, 43a are described in detail with respect to the first end member 37a, with the understanding that the second end member 43a is identical in construction except that the second end member 43a engages the control element 24.

The end member 37a includes a spherical, universal ball member 152 which has a spool or spacer 56a integrally formed therewith. The universal ball member 152 is formed at one end of the spacer 56a. The spacer 56a and the universal ball member 156 have a central passageway 154 therethrough which has a diameter that is slightly greater than the diameter of the rod 30a. The spacer 56a extends along an intermediate portion 58a of the bolt 26a. The spacer 56a may have reinforcing ribs thereon which generally extend the length of the spacer 56a.

The shock absorber 150 is positioned at the opposite end of the spacer 56a (and the spacer 56a of the second end member 43a is positioned on the other side of the shock absorber such that the shock absorber 150 is between the spacers 56a). The spacers 56a are seated tightly against the elastomeric shock absorber 150. The spacers 56a and the shock absorber 150 maintain the desired spacing between the first element or stabilizer bar 22 and the second element or control element 24. The shock absorber 150 absorbs shock forces in the end link 20a.

A nut 60a is applied to the threaded end portion 34a of the bolt 26a for maintaining the parts in assembled relationship. Washer 48a is disposed between the head 28a and the end member 37a. Washer 54a is disposed between the nut 60a and the end member 43a.

Referring now to FIG. 9, it is seen that the end member 37a further includes first and second sections, a washer 62a and a bushing 64a. The washer 62a and bushing 64a abut against each other. The bushing 64a is rotatable with respect to the washer 62a and the control element 22 in response to universal movement between the rod 30a and the end members 37a, 43a as described more in detail hereinbelow. The washer 62a is made of a suitable material, preferably steel, and the bushing 64 is made of a suitable material, preferably hard plastic. The washer 62a is seated in the aperture through and substantially fixed relative to the control element 22.

The washer 62a has a generally truncated conical body portion 66a which defines a first end 68a and a generally cylindrically shaped shoulder 70a which defines a second end 72a. Each end 68a, 72a of the washer 62a has a circular aperture 156, 158 formed therein and the washer 62a has a central recess 74a therethrough which is partially hemispherically shaped such that the recess 74a corresponds in shape to the spherical universal ball member 152 which is seated therein. The second end 68a of the washer 62a truncates the hemispherical recess 74a such that an upper portion of the universal ball member 142 extends beyond the washer 62a when seated therein, as shown in FIG. 10.

The elements of the bushing 64a, along with its elongated slot 86a and central passageway 88a, are substantially identical to the elements, 64, 86 and 88 respectively, of the washer 62 in the first embodiment, and, as such, the specifics of the washer construction is not repeated herein, but the like elements are labeled in the drawings. In the second embodiment of the end link 20a, however, the shoulder used for interengaging the washer and bushing together in the first embodiment of the end link 20 has been eliminated. Instead, the washer 62a and bushing 64a abut against each other at bearing faces. When the washer 62a and bushing 64a abut against each other, the second end 158 of the washer recess 74a and the second end 82a of the bushing passageway 88a are aligned.

To form the end member 37a on the end of the bolt 26a, the generally truncated conical body portion 66a of the washer 62 is inserted into the aperture provided through the control element 22. The second end 82a of bushing 64a is placed against the second end 68a of the washer 62a. The spherical universal ball member 152 is inserted into the hemispherical recess 74a in the washer 62a. The top portion of the universal ball member 152, as shown in FIGS. 10 and 11, extends slightly into the passageway 88a through the washer 64a. The control element 22 or 24 is held between the washer 62a and the bushing 64a. It is to be understood that the coefficient of friction of the metal washer 62 is sufficiently related to the coefficient of friction of the metal stabilizer element or bar 22 or the metal control element or bar 24 such that the washer 62a generally does not rotate relative to the elements 22, 24. The rod 30a is disposed within the passageway 154 through the spacer 56a and the universal ball member 152 and the aligned recess 74a through the washer 62a and the passageway 88a through the bushing 64a.

The bottom surface 82a of the bushing 64a provides a bearing surface along which the bushing 64a may rotate with respect to the control element 22 or 24. The bearing surface 82a is generally smooth and so as to allow the parts to rotate easily relative to each other. A desired ease of rotation between the bushing 64a and the control element 22 or 24 can be achieved by modifying the coefficient of friction of the plastic material used. For example, nylon, acetal copolymer or acetal homopolymer may be used to produce the bushing 64a. The universal ball member 152 rotates relative to the washer 62a which is substantially fixed relative to the control element 22 or 24.

The washers 48a and 54a which engage the outermost extents of each end member 37a, 43a, i.e. the washers 48a, 54a respectively engage the arcuate portion 76a of the respective bushing 64a, include a seat 106a that is complementarily shaped to the arcuate portion 76a of the bushing 64a. The washers 48a, 54a are formed from a suitable material, preferably metal, such as steel, and the seat 106a may be formed by any suitable known method, such as stamping or coining. When a washer 48a or 54a is disposed on the arcuate portion 76a of the bushing 64a, the washer 48a or 54a is free to travel along the arc of the arcuate portion 76a when there is relative movement between the stabilizer bar 22 and the control element 24. Each washer 48a, 54a also includes a circular aperture 108a generally in the center thereof to allow the rod 30a to pass through the washer 48a, 54a.

Now that the specifics of the second embodiment of the end link 20a have been described, a general description of how the end link 20a operates will be explained. Initially, the bolt 26a extends generally perpendicularly between the first element or stabilizer bar 22 and the second element or control element 24, as shown in FIGS. 8 and 10, and sits generally in the center of the end members 37a, 43a.

When an input load is incurred, as shown in FIG. 11, the rod 30a begins to move or pivot along a single plane in the straight slot 86a. When the rod 30a pivots, the seat 106a of each washer 48a, 54a slides along the arc of the arcuate portion 76a. Since the passageway 88a is tapered, the rod 30a is free to pivot positively or negatively, e.g. plus or minus 30°, from the vertical position or some lesser or greater angle determined by the slope of the passage 88a surface. When the rod 30a moves or pivots along the single plane in the straight slot 86a, the universal ball member 152 pivots relative to the washer 62a.

As the rod 30a leaves the center of the slot 86a and as any amount of side load is incurred, the rod 30a begins to push against the vertical side wall of the slot 86a and passageway 88a. The universal ball 152 rotates conically relative to the washer 62a. This force results in a moment about the center of the bushing 64a causing it to rotate relative to the washer 62a and control element 22 or 24 as shown in FIG. 12. The rod 30a can universally pivot generally around the center of each ball member 37a, 43a, that is, move 360° conically by this pivoting on each end of the end link 20a.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A link for accommodating adjustment between first and second elements comprising: an elongated connecting member for extending between the first and second elements, and an end member on an end portion of said connecting member for embracing the first element, said end member having a central vertical axis therethrough and means for permitting universal pivotal movement of said connecting member around substantially a center of said end member and for permitting positive and negative pivotal movement of said connecting member relative to said central vertical axis of said end member and only substantially in a single plane relative to said end member.

2. A link as defined in claim 1, further including an opposite end member on an opposite end portion of said connecting member for embracing the second element; said opposite end member having means for permitting universal pivotal movement of said connecting member around substantially a center of said opposite end member and for permitting pivotal movement of said connecting member only substantially in a single plane relative to said opposite end member.

3. A link as defined in claim 2, further including at least one spacer member between said end member and said opposite end member.

4. A link for accommodating adjustment between first and second elements comprising: an elongated connecting member for extending between the first and second elements, and an end member on an end portion of said connecting member for embracing the first element, said end member having means for permitting universal pivotal movement of said connecting member around substantially a center of said end member and for permitting positive or negative pivotal movement of said connecting member only substantially in a single plane relative to said end member, said end member including first and second portions for embracing the first element, each of said first and second portions including first and second relatively rotatable sections having a central passageway therethrough defining said means, the means of said passageway in said first sections for permitting said universal pivotal movement of said connecting member generally around said center of said end member. and the means of said passageway in said second sections for permitting said positive or negative pivotal movement of said connecting member only substantially in said single plane relative to said second sections, whereby said second sections will rotate relative to said first sections in response to universal relative movement between said connecting member and said end member.

5. A link as defined in claim 4, wherein each of said first sections having a conical central passageway therethrough defining said means in said first sections, and each of said second sections having a passageway slot defined in part by opposite side walls defining said means in the second sections.

6. A link as defined in claim 5, wherein said connecting member has a predetermined diameter and said side walls of said passageway slot comprises opposite tapered side walls and opposite straight side walls connecting said tapered side walls together, said straight side walls being spaced apart from each other a distance which is slightly greater than the diameter of said connecting member.

7. A link as defined in claim 5, wherein each of said second sections has an arcuate outer end, said link further including means at opposite ends of said connecting member for slidably engaging said arcuate outer ends.

8. A link as defined in claim 4, further including an opposite end member on an opposite end portion of said connecting member for embracing the second element; said opposite end member having means for permitting universal pivotal movement of said connecting member around substantially a center of said opposite end member and for permitting positive or negative pivotal movement of said connecting member only substantially in a single plane relative to said opposite end member.

9. A link as defined in claim 8, further including a spacer on said connecting member between said end member and said said opposite end member.

10. A link for accommodating adjustment between first and second elements comprising:

an elongated connecting member for extending between said first and second elements, an end member on an end portion of said connecting member for embracing said first element;

said end member having a central vertical axis therethrough and including first and second portions for embracing said first element; said second portion being rotatable relative to said first portion, said first portion having means for permitting universal pivotal movement of the connecting member around substantially a center of the end member, and said second portion having means for permitting positive and negative pivotal movement of the connecting member relative to said central verticle axis of the end member and only substantially in a single plane relative to said end member, whereby said second portion will rotate relative to said first portion in response to relative movement between the connecting member and the end member.

11. A link as defined in claim 10, wherein said second portion has a passageway slot defined in part by opposite side walls providing said means in the second portion, and said first portion comprises a washer having a substantially hemispherical recess therein, and a universal ball member engaged in said hemispherical recess providing said means in said first portion.

12. A link as defined in claim 11, wherein said universal ball member encircles a portion of said connecting member.

13. A link as defined in claim 12, wherein said washer is adapted to be substantially fixed relative to said first element.

14. A link as defined in claim 12, wherein said second portion has an arcuate outer end, and further including means for slidably engaging said arcuate outer end.

15. A link as defined in claim 14, wherein said means for slidably engaging said arcuate outer ends is a complementarily shaped washer.

16. A link as defined in claim 10, further including an opposite end member on an opposite end portion of said connecting member for embracing said second element;

said opposite end member having means for permitting universal pivotal movement of the connecting member around substantially a center of the opposite end member and for permitting pivotal movement of the connecting member only substantially in a single plane relative to said opposite end member.

17. A link as defined in claim 16, further including at least one spacer member between said end member and said opposite end member.

18. A link as defined in claim 17, wherein two spacer members are provided and further including a shock absorber member between said spacer members.

* * * * *